United States Patent
Szucs et al.

(10) Patent No.: US 7,836,159 B2
(45) Date of Patent: Nov. 16, 2010

(54) CONTROL OF HOME NETWORK DEVICES

(75) Inventors: Paul Szucs, Ostfildern (DE); Matthias Mayer, Stuttgart (DE); Stephen Tiedemann, Stuttgart (DE); Sabine Terranova, Stuttgart (DE)

(73) Assignee: Sony Deutschland GmbH, Koeln (DE)

( * ) Notice: Subject to any disclaimer, the term of this patent is extended or adjusted under 35 U.S.C. 154(b) by 955 days.

(21) Appl. No.: 10/096,894

(22) Filed: Mar. 13, 2002

(65) Prior Publication Data
US 2002/0169845 A1 Nov. 14, 2002

(30) Foreign Application Priority Data
Mar. 15, 2001 (EP) .................. 01106597

(51) Int. Cl.
*G06F 15/16* (2006.01)
*G06F 17/30* (2006.01)

(52) U.S. Cl. .................. 709/223; 709/206; 709/203; 709/204; 705/10; 705/14; 707/3; 707/6; 707/10

(58) Field of Classification Search .............. 709/223, 709/224, 209, 244, 204, 203; 705/10, 14; 707/3, 6, 10
See application file for complete search history.

(56) References Cited

U.S. PATENT DOCUMENTS

| | | | | |
|---|---|---|---|---|
| 6,085,236 | A * | 7/2000 | Lea | 709/220 |
| 6,298,377 | B1 * | 10/2001 | Hartikainen et al. | 709/223 |
| 6,618,764 | B1 * | 9/2003 | Shteyn | 709/249 |
| 7,039,858 | B2 * | 5/2006 | Humpleman et al. | 715/205 |
| 7,530,024 | B2 * | 5/2009 | Takahashi et al. | 715/763 |
| 2001/0032273 | A1 * | 10/2001 | Cheng | 709/249 |
| 2001/0047431 | A1 * | 11/2001 | Eytchison | 709/249 |
| 2002/0078259 | A1 * | 6/2002 | Wendorf et al. | 709/328 |
| 2004/0168166 | A1 * | 8/2004 | Abramowski et al. | 717/168 |

FOREIGN PATENT DOCUMENTS

| | | |
|---|---|---|
| EP | 0 909 056 | 4/1999 |
| EP | 0 929 170 | 7/1999 |
| WO | WO 00 76130 | 12/2000 |

OTHER PUBLICATIONS

PCT, International Publication No. WO 00/04427 by United Technology Pty. Ltd, filled 27, Jan. 2000.*

(Continued)

*Primary Examiner*—Ario Etienne
*Assistant Examiner*—Sahera Halim
(74) *Attorney, Agent, or Firm*—Oblon, Spivak, McClelland, Maier & Neustadt, L.L.P.

(57) ABSTRACT

A JAVA package (1) usable by a JAVA application (26, 27) to control home network devices is provided, which comprises an adapting means (12) and a device controlling means (16), wherein said device controlling means (16), which provides device specific functionality to control said home network devices, is adaptable by said adapting means (12) to a changing home network device status resulting from home network device correlated events registrated by a managing layer (2, 3). Advantage of this lean architecture of said JAVA package (1) is an easy extendibility and low complexity.

7 Claims, 2 Drawing Sheets

OTHER PUBLICATIONS

"The HAVi Specification" Specification of the Home Audio/Video Interoperability (HAVi) Architecture HAVi Specification, XX, XX, Nov. 19, 1998, pp. 1-384, XP 002116332.

Masayuki Iwai, et al., "Dynamic Redirectionable Distributed Event Model for Intelligent Home Appliances Network", IEICE Technical Report, The Institute of Electronics, Information and Communication Engineers, vol. 100, No. 86, May 25, 2000, pp. 39-46 (with English Abstract).

Tomihisa Kamada, "JAVA Forefront 11. Consumer Open Java Module: JV-Lite", Bit vol. 31, No. 6, Jun. 1, 1998, pp. 72-81.

Akihiko Minami, et al., "Engineering Techniques for Next Generation and Reengineering, Challenge to Greater Customer Satisfaction Measurement and Timely Product Development, Design Innovation", Toshiba Review, vol. 54, No. 9, Sep. 1, 1999, pp. 45-48.

* cited by examiner

CONTROL OF HOME NETWORK DEVICES

The invention relates to a functionality module for controlling home network devices and a method for using it.

BACKGROUND

It is known to use JAVA® home network applications for controlling home network devices. To do this, usually a JAVA® home network interface as a functionality module is used which provides the necessary home network device controlling functionality to the JAVA® application. The HAVi (home audio/visual initiative) specification, for example, defines a JAVA® architecture as a JAVA® home network interface for controlling home network devices which provides many features that are common to computer system networks for home networks. An example for the use of such a HAVi architecture is disclosed in document EP 0 929 170 A2, for example.

However, the HAVi architecture provides a very complex software home network interface which therefore needs a lot of computational resources. JAVA® applications which use the HAVi architecture, but only need a little part of the functionality provided by it, have the problem of "carrying" a large "functionality overhead".

SUMMARY OF EXEMPLARY ASPECTS OF THE INVENTION

It is an object of the invention to provide a functionality module which enables a simple and computational resource saving controlling of home network devices.

To solve this object, the present invention provides a functionality module usable by a control unit for home network devices, which is characterized by a managing unit providing functionality for registrating home network device correlated events in a home network and for communicating with said home network devices, a device unit linked to said managing unit, said device unit comprising an adapting means and a device controlling means, wherein said device controlling means provides home network device specific functionality to control said home network devices and is adaptable by said adapting means to a changing home network device status resulting from said home network device correlated events.

Further, the present invention provides a method for controlling home network devices by a control unit, which is characterized in that said control unit uses an external functionality module as a controlling and as an information providing server, wherein said functionality module registrates home network device correlated events in a home network, interprets corresponding home network event information, and adapts a device controlling means included within said functionality module to a changing home network device status which results from said home network device correlated events by using interpreted home network event information, wherein said control unit uses said adaptable device controlling means to control said home network devices.

Further preferred embodiments of the functionality module as defined in independent claim 1, and further preferred embodiments of the method as claimed in independent claim 13, are described in the respective subclaims.

The functionality module and the control unit may consist of hardware, software or a mix of both, respectively. In a preferred embodiment, both the functionality module and the control unit are realized in software form. In the following description, the principles of the invention are explained using a preferred embodiment, in which the control unit is represented by a JAVA® application and the functionality module is represented by a JAVA® package. Further, the managing unit and the device unit will be referred to as managing layer and device layer within the JAVA® package representing the functionality module.

A general idea is to provide an object oriented functionality module architecture (here represented by the JAVA® package) which shows a layered structure, and in which all functionality being absolutely needed by the application regardless of the type of device to be controlled is located in the lower layers, wherein all device specific functionality is located in the upper layers. The advantage of this concept is that it is possible to clearly separate general functionality from specific functionality, which results in a low complexity of the JAVA® package. A further advantage is that the functionality of the JAVA® package is easy to change/extend by only changing/extending functionality of the upper layers while leaving functionality of the lower layers "untouched". Preferably, the "core" functionality is concentrated in a managing layer, which in particular provides device independent functionality for communicating between the JAVA® application and the home network devices.

The physical presence of all devices included in the home network as well as their corresponding inner state can be represented, regarded as a whole, as a home network device status. For example, a home network comprising only a switched off television and a switched on tape, may be represented by a home network device status "television/off tape/on". Regarding the case that the tape is replaced by a switched off tuner, for example, the home network device status is changed into "television/off tuner/off". The functionality of the managing layer is capable of registrating the actual home network device status or any event which changes this status, which means that the functionality of the managing layer is capable of extracting all information about "what is going on" in the network. The events which change the home network device status are "external events" with respect to the JAVA® package and will be referred to as home network device correlated events. Information about such home network device correlated events as well as corresponding home network device specific information will be referred to as "home network event information".

To give another example for a home network device correlated event: If a new home network device (in the following only referred to as device) has been added to the home network, then the functionality of the managing layer is capable of registrating this "device adding" event as a home network device correlated event (in the following only referred to as device correlated event). The managing layer is able to find out device specific information by communicating with this device. For example, the managing layer may find out if the new device is a stereo unit, and, if it is, extract further information like information about all subunits included in the stereo unit like a tuner subunit, a tape subunit or a disk unit.

Events initiated by functionality of the JAVA® package itself (which will be referred to as internal events) have to be distinguished from device correlated events. For example, if functionality of the JAVA® package recognizes that a tape of a tape device has reached its end (home network device correlated event), it may cause a callback function call to other parts of the JAVA® package or to the JAVA® application. The procedure of causing a callback function call is an internal event, which is not regarded as a device correlated event, but is generally caused by a device correlated event, and may therefore be assigned to a device correlated event. Information about such internal events can be regarded as "internal event information".

The device layer comprises a device controlling means, which provides device specific functionality being directly usable by the JAVA® application to control the devices. For example, the device controlling means comprises functionality (commands) for switching on a tuner device or for ejecting an inserted tape out of a tape device. The functionality of the device controlling means shows the finest granularity of all functionality of the JAVA® package, which means that it is the most specialized functionality.

Another important aspect of the invention is that the device layer is capable of adapting the device controlling means itself to the actual home network device status, which is, as already mentioned, changeable by device correlated events. Therefore, the device layer comprises adapting means which are capable of creating new device controlling means functionality, deleting existing device controlling means functionality, or changing existing device controlling means functionality. The adapting means itself preferably is extendable or changeable by a user or by the JAVA® application.

The adapting means uses information about the actual home network device status provided by functionality of the managing layer. That is, the adapting means interprets status information or information of a single event as home network event information and adapts the device controlling means accordingly. This has the advantage that the JAVA® application does not have to care about changing conditions in the home network to which it is automatically adapted, as necessary correlated changes in the device controlling means are completely done by the JAVA® package itself. For example, if a tuner subunit of a stereo unit gets disconnected, then the managing layer will realize this as a device correlated event and message the corresponding home network event information to the adapting means. The adapting means interprets the home network event information and may decide for example to delete the corresponding tuner functionality within the device controlling means. Thereby the JAVA® application is notified that it could no longer control the tuner. To give another example: If a new device is added to the home network, then the managing layer will realize this, read out device specific information from this device and provide the adapting means with this device Information as home network event information. The adapting means may then create all functionality corresponding to the read out device information. The JAVA® application realizes that the functionality of the device controlling means has changed and adapts its behavior thereto.

In a preferred embodiment, the managing layer comprises a general layer and a control protocol layer, wherein the general layer provides functionality being common to the control protocol layer and the device layer, and the control protocol layer provides control protocol specific functionality. This clear separation has the advantage that it is easy to change the control protocol being used by the JAVA® package, as the control protocol functionality is not located in the general layer. To exchange the control protocol, only the control protocol specific functionality of the control protocol layer has to be exchanged. The functionality of the general layer is control protocol independent.

This principle is also used between the control protocol layer and the device layer. That is, the control protocol layer only comprises device specific independent functionality. This means that each upper layer contains at least parts of the functionality of the corresponding lower layer plus further functionality.

In other words, the principles (functionality) of a lower layer are used in all upper layers. An advantage of this principle is a lean architecture needing only low computational resources and being easy to extend.

In the above description, JAVA® has been used to describe the principles of the invention. However, any other programming language like C++ or SMALLTALK may be used as a basis for the functionality module in case this is realized as a software package. Further, as mentioned above, the functionality module might also be realized in hardware or a combination of hard- and software.

The functionality of the functionality module is preferably provided in form of a class-based architecture.

BRIEF DESCRIPTION OF THE SEVERAL VIEWS OF THE DRAWINGS

Further features and advantages of the present invention will be explained below in conjunction with the accompanying drawings, in which.

DETAILED DESCRIPTION

Figure 1:
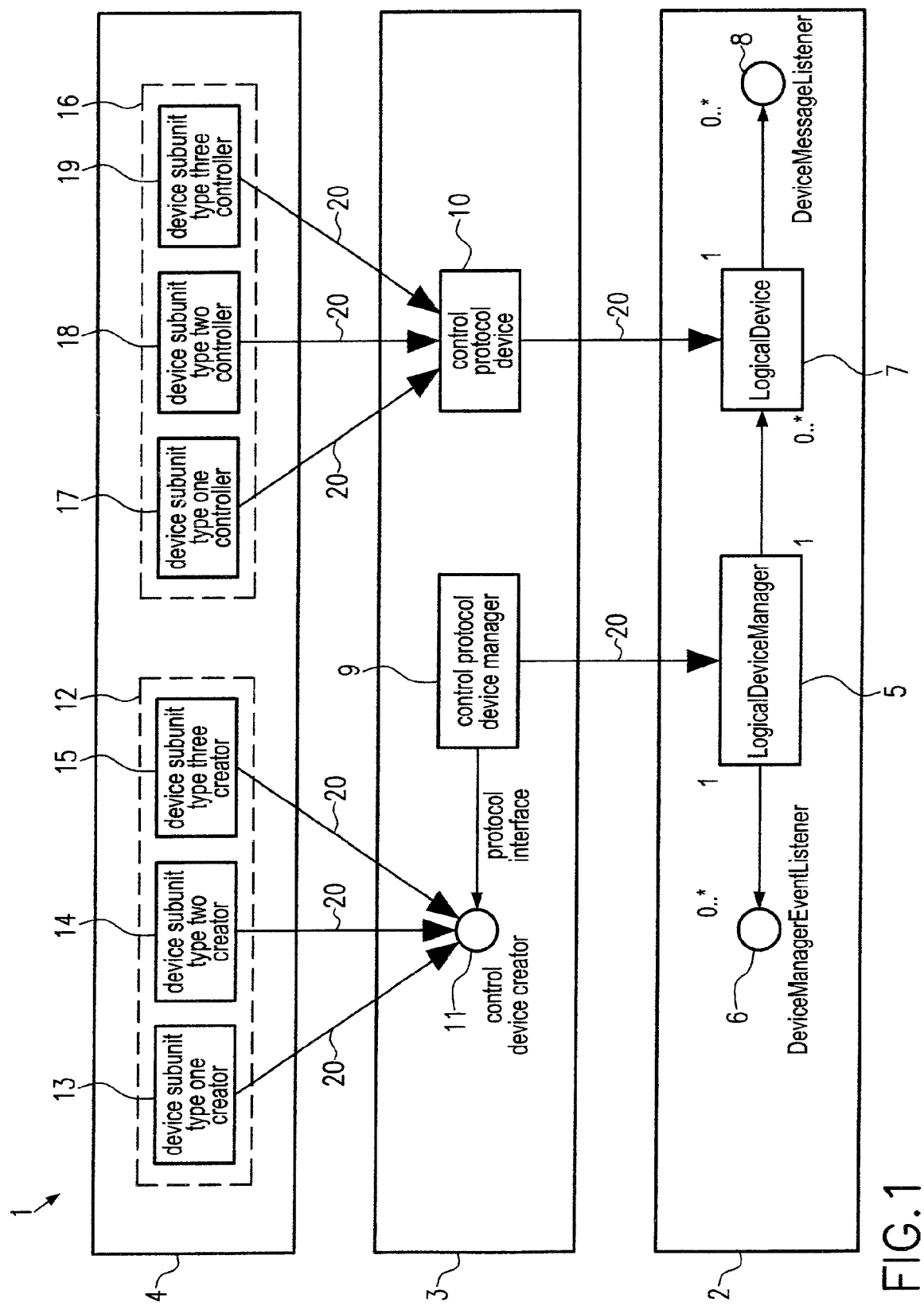
FIG. 1 shows a schematic drawing of a preferred embodiment of a JAVA® package with a three layer architecture according to the present invention.

In the following description, making reference to FIG. 1, a preferred embodiment of an architecture of a JAVA® package is described.

A JAVA® package 1 comprises a general layer 2, a control protocol layer 3, and a device layer 4. The general layer 2 comprises a logical device manager 5 providing control protocol independent functionality for maintaining a list of available devices in the home network, for maintaining a list of device manager event listener objects subscribable at the logical device manager 5, and for messaging at least parts of device event information to the subscribed device manager event listener objects. The messaging process to the device manager event listener objects and the subscribing process of the device manager event listener objects at the logical device manager 5 is done via a device manager event listener interface 6. Therefore, all device manager event listener objects which want to communicate with the logical device manager 5 have to implement the device manager event listener interface 6. Preferably, the logical device manager 5 messages events concerning newly connected or removed devices within the home network to the device manager event listener.

According to the number of physical home network devices (zero or more), the general layer 2 further comprises zero or more logical devices 7 linked to the logical device manager 5, wherein each of the logical devices 7 corresponds to one of the physical home network devices, respectively. Each logical device 7 provides control protocol independent functionality for communicating with the corresponding physical device and for messaging parts of home network event information to device listener objects subscribable at said logical device 7, respectively. For example, the event of the end of a running tape in a tape device is messaged directly to the JAVA® application. In this sense, the JAVA® package 1 can be regarded as an information providing server, which is capable of sending home network event information directly to an information client (here: client is the JAVA® application as a device message listener).

The messaging process to the device message listener objects and the subscribing process of the device message listener objects at the logical device 7 is done via a device message listener interface 8. Therefore, all device message listener objects which want to communicate with the logical device 7 have to implement the device message listener interface 8.

The device manager event listener objects and/or the device message listener objects may be software objects of higher software layers 3, 4 of the JAVA® package 1 or software objects of a JAVA® application using the JAVA® package 1 or software objects assigned to respective devices of the home network.

The control protocol layer 3 comprises a control protocol device manager 9 providing all functionality of the logical device manager 5 and additional control protocol specific functionality. The control protocol layer 3 further comprises zero or more control protocol devices 10 which correspond to one of the logical devices 7, respectively, and which provide besides functionality of the corresponding logical device 7 additional control protocol specific functionality. Further, the control protocol layer 3 comprises a control protocol device creator interface 11 providing device independent interface structures between the control protocol device manager 9 and adapting means 12 contained in the device layer 4.

The control protocol specific functionality may for example be AV/C (Audio-Video/Control) functionality. However, it is possible to use any other suitable control protocol, too.

Preferably, functionality of the lower layers is transferred to the upper layers by inheritance, which is indicated with arrows having the reference sign 20, respectively. This means for example, that the functionality of an AV/C Device as a control protocol device 10 is created by inheriting the functionality of the logical device 7 and adding AV/C specific functionality to it. This means, that the AV/C Device contains the functionality being common to all real AV/C devices like tuners, disks, e.g. the capability to send and receive AV/C based messages.

In a preferred embodiment, for each type of control protocol device 10 a corresponding control protocol adapting device creator 11 is provided.

The adapting means 12 comprises, for example, three device subunit creator, namely a device subunit type one creator 13, a device subunit type two creator 14, and a device subunit type three creator 14. The device layer 4 further comprises a device controlling means 16 comprising zero or more device subunit controller, here a device subunit type one controller 17, a device subunit type two controller 18, and a device subunit type three controller 19 corresponding to one of the device subunit creator 13, 14, 15, respectively. The device subunit creator 13, 14 and 15, as well as the device subunit controller 17, 18, and 19 are realized in form of object classes, respectively. Each object derived from a device subunit creator object class is capable of creating an object of the corresponding device subunit controller object class. For example, if two identical physical AV/C tuner devices are added to the home network, the corresponding AV/C tuner creator object will create two AV/C tuner controller objects derived from the same AV/C tuner controller object class. As a consequence, each individual physical device unit corresponds to an own device subunit controller object, and each functional type of a physical device unit corresponds to an own device subunit creator object class and an own device subunit controller object class.

Thus, each object derived from the device subunit controller 17, 18, 19 is creatable/adaptable by an object derivable from the corresponding device subunit creator 13, 14, 15 according to information which is supplyable by the control protocol device manager 9 to the device subunit creator 13, 14, 15 via the control protocol device creator interface 11, said information being based on home network event information. The functionality of the device subunit controller 17, 18, 19 is derivable from the functionality of the control protocol device 10 and additionally contains the special device functionality that is needed to control real devices. For example, the device subunit controller 17, 18 and 19 may be an AV/C tuner controller, an AV/C disc controller and an AV/C tape controller, respectively. Corresponding thereto, the device subunit creator 13, 14 and 15 may be an AV/C tuner creator, an AVIC disc creator and an AV/C tape creator, respectively.

The control protocol device manager 9 is responsible for initiating the creation or the adoption of objects derivable from device subunit controller 17, 18, 19 by using implementations of the control protocol device creator interface 11. The control protocol device manager 9 retrieves device unit information or device subunit information from the devices in the home network as home network event information, preferably interprets the device unit information itself and delegates the interpretation of the device subunit information via the control protocol device creator interface 11 corresponding to the device unit to the adapting means 12.

The functionality of the adapting means 12 and/or controlling means 16 is extendable/changeable by the JAVA® application developer. This is preferably done by adding/deleting/changing device subunit creator object classes to the adapting means 12 and adding/deleting/changing corresponding device subunit controller object classes to the controlling means 16.

The functionality of the logical device manager 5, the logical device 7, the control protocol device manager 9, the control protocol device 10, the control protocol device creator interface 11, the adapting means 12, the device subunit creator 13, 14, 15, the device controlling means 16 and the device subunit controller 17, 18, 19 are realized in form of JAVA® classes, respectively.

An advantage of the JAVA® package architecture 1 described in the embodiment above is that it is easy to extend. If a new device type has to be supported, only a corresponding new device subunit creator object class, which contains necessary information about the new device, has to be Implemented within the adapting means 12. Further, the functionality of the device controlling means 16 is extended by a corresponding device subunit controlling object class. The rest of the architecture remains "untouched".

In the following description, an example of possible functionality of the logical device manager 5, the logical device 7, the control protocol device manager 9, the control protocol device 10, the control protocol device creator interface 11, the adapting means 12, the device subunit creator 13, 14, 15, the device controlling means 16 and the device subunit controller 17, 18, 19 is given in form of respective APIs (application program interfaces). In this example, AV/C is used as control protocol.

TABLE 1

List of Logical Device Manager API

| API function | Description |
| --- | --- |
| AVCDeviceManager::RegisterAVCDeviceCreator | Registration as AV/C Device Creator by passing a reference of the object that will create a certain type of AV/C Device. |
| AVCDeviceManager::UnregisterAVCDeviceCreator | Cancel registration by passing a reference of the object that wants to cancel its registration as AV/C Device Creator. |
| AVCDeviceCreator::CreateDevice | An AV/C Device Creator has to implement this function. It will be called by the AV/C Device Manager to initiate the creation of a device. The subunit type is passed as parameter. |
| LogicalDeviceManager::GetDeviceList | Returns the list of Logical Device objects |
| LogicalDeviceManager::Subscribe | Subscribe as Device Manager Event Listener by passing a reference of the object that wants to be notified. This object has to implement the Device Event Listener interface. |
| LogicalDevtceManager::Unsubscribe | Unsubscribe as Device Manager Event Listener by passing a reference of the object that doesn't want to be notified any more. |
| DeviceManagerEventListener:NewDevice | Called by the Logical Device Manager to notify a subscriber about a new device on the network. |
| DeviceManagerEventListener::GoneDevice | Called by the Logical Device Manager to notify a subscriber about a gone device on the network. |

TABLE 2

List of Logical Device API

| API function | Description |
| --- | --- |
| LogicalDerice::GetGuid | Returns the guid of the Logical Device object. |
| LogicalDevice::Subscribe | Subscribe as Device Message Listener by passing a reference of the object that wants to be notified. This object has to implement the Device Message Listener interface. |
| LogicalDevice::Unsubscribe | Unsubscribe as Device Message Listener by passing a reference of the object that doesn't want to be notified any more. |
| LogicalDevice::Send | This function has to be used when an FCP message has to be sent. |
| DeviceMessageListener::Receive | Called by a Device object to notify a subscriber about a message that has been arrived from the device represented by the Device object. |

TABLE 4

List of AV/C Device API

| API function | Description |
| --- | --- |
| AVCDevice::GetAVCDeviceType | Returns the device type (Tuner, Disc, . . .) |
| AVCDevice::Send | This function has to be used when an AV/C message has to be sent. |

TABLE 5

List of AV/C Tape API

| API function | Description |
| --- | --- |
| AVCTape::Play | Initiates playing of the inserted tape. |
| AVCTape::Stop | Stops the all motion of the tape. |
| AVCTape::Record | Records data on the inserted tape. |
| AVCTape::EjectMedium | Ejects the tape. |
| AVCTape::FastRewind | Rewinds the tape. |
| AVCTape::FastForward | Fast-forwards the tape. |
| AVCTape::Pause | Pauses the current motion. |

Figure 2:
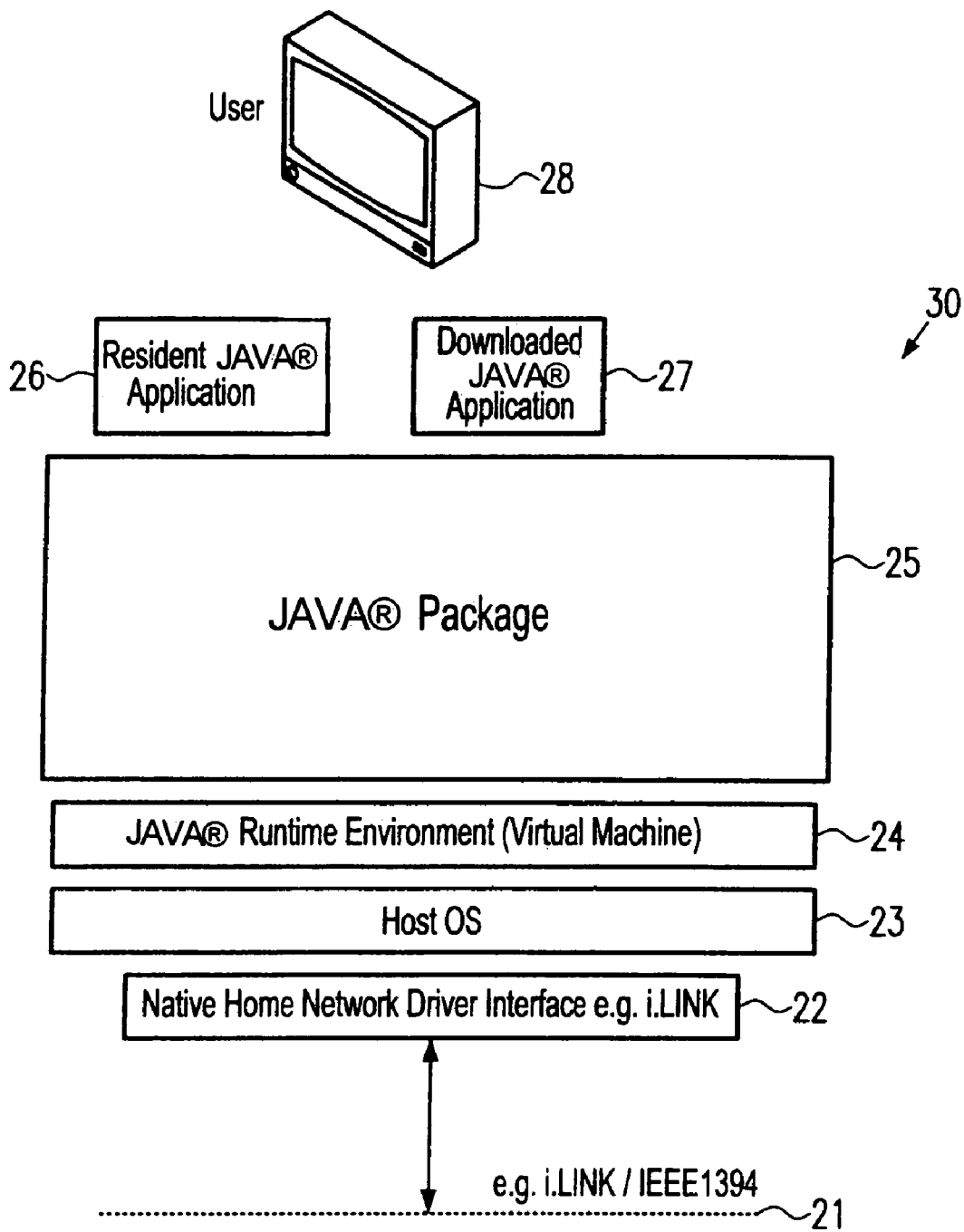
FIG. 2 shows a schematic drawing of a preferred embodiment of a general software architecture including a JAVA® package, a JAVA® application and network software according to the present invention.

In the following description, making reference to FIG. 2, a preferred embodiment of a general software architecture including a JAVA® package as a functionality module, a JAVA® application as a controlling unit and network software is described.

A general software architecture 30 comprises a native home network driver interface 21, for example a LINK or a IEEE1394 interface for communicating with a home network bus 22. The driver interface 22 is controlled by a host operating system 23. The host operating system 23 provides itself as a basis for a JAVA® runtime environment (virtual machine) 24. A JAVA® package 25, for example as described above, uses the JAVA® runtime environment 24 to do its tasks, wherein a resident JAVA® application 26 or a downloaded JAVA® application 27 uses the JAVA® package 25 to do the tasks given by a user 28 to the JAVA® application 26, 27.

The present invention provides a functionality module which might advantageously be realized as a JAVA® package that abstracts from the underlying hardware, provides an easy means for informing about and controlling home network devices, and does not include complicated user interface aspects. Therefore, a very flexible means for an application to control home network devices is provided.

The invention claimed is:

1. A functionality module, stored on a non-transitory computer-readable memory, the module being executed by a control unit for home network devices, to perform steps comprising:
  registering, by a managing unit, home network device correlated events in a home network and communicate with said home network devices; and
providing, by at least one device subunit controller object class corresponding to at least one device subunit creator object class, respectively, home network device specific functionality to control said home network devices, wherein
  an object derived from said at least one device subunit creator object class is configured to create a device subunit controller object based on said home network correlated events, said device subunit controller object being derived from the corresponding device subunit controller object class,
  wherein a device unit linked to said managing unit includes said at least one device subunit creator object class and said at least one device subunit controller object class;
  said managing unit includes a general unit and a control protocol unit, and
  said general unit provides functionality common to said control protocol unit and said device unit, and includes
providing, by a logical device manager on said general unit, control protocol independent functionality for maintaining a list of available home network devices, maintain a list of device manager event listener objects subscribable at said logical device manager, and message at least parts of home network device correlated home network event information to said subscribed device manager event listener objects; and
  providing, by one or more logical devices linked to said logical device manager corresponding to one of said home network devices, respectively, control protocol independent functionality for communicating with said corresponding home network devices and for messaging at least parts of home network device event information to device message listener objects subscribable at said logical device, respectively, wherein said general unit includes said one or more logical devices,
creating, by said control protocol unit device independent interface structures for each of said home network devices to communicate with each of said home network devices;
providing, by said control protocol unit said at least one device subunit creator object class with the created device independent interface structures;
providing, by said control protocol unit, the at least one device subunit controller object class with functionality of said one or more logical devices included in said general unit; and
providing, by said control protocol unit, protocol-specific functionality between the at least one device subunit controller and each of said logical devices included in said general unit.

2. The functionality module according to claim 1, wherein said control protocol unit includes a control protocol device manager providing all functionality of said logical device manger and additional control protocol specific functionality.

3. The functionality module according to claim 1,
  wherein said control protocol unit includes one or more control protocol devices which correspond to one of said one or more logical devices, and which provide functionality of said corresponding logical device and additional control protocol specific functionality.

4. The functionality module according to claim 1, wherein device subunit creator object classes are extendable/changeable by a control unit developer.

5. The functionality module according to claim 1, wherein device subunit controller object classes are extendable/changeable by a control unit developer.

6. The functionality module according to claim 1, wherein the module is a software module.

7. The functionality module according to claim 1, wherein said functionality module is a JAVA package, wherein said managing unit is a managing layer, and said device unit is a device layer.

* * * * *